US007463194B1

United States Patent
Sahinoglu

(10) Patent No.: US 7,463,194 B1
(45) Date of Patent: Dec. 9, 2008

(54) METHOD FOR REDUCING RADIO RANGING ERRORS DUE TO CLOCK FREQUENCY OFFSETS

(75) Inventor: Zafer Sahinoglu, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/749,517

(22) Filed: May 16, 2007

(51) Int. Cl.
*G01S 3/02* (2006.01)
(52) U.S. Cl. .................................. 342/458; 342/442
(58) Field of Classification Search ............ 342/442, 342/451, 458, 463–465
See application file for complete search history.

(56) References Cited

U.S. PATENT DOCUMENTS

| 6,975,655 | B2* | 12/2005 | Fischer et al. ............ 370/516 |
| 7,035,285 | B2* | 4/2006 | Holloway et al. .......... 370/474 |
| 2002/0057717 | A1* | 5/2002 | Mallory ................... 370/503 |

* cited by examiner

*Primary Examiner*—Dao L Phan
(74) *Attorney, Agent, or Firm*—Dirk Brinkman; Gene Vinokur

(57) ABSTRACT

A method reduces errors in two-way ranging between transceivers due to a frequency offset. A first transceiver measures a time $C_{A1}$ between transmitting a request frame and receiving a reply frame, and a time $C_{A2}$ between receiving a first information bit of the reply frame and receiving a last information bit of the reply frame. A second transceiver measures a time $C_{B2}$ between receiving the request frame and transmitting the last information bit of the reply frame, and a time $C_{B1}$ between receiving a first information bit of the request frame and a last information bit of the request frame. A correction factor $$\alpha_c = \sqrt{\frac{C_{B1}}{C_{A2}}}$$

is applied according to $$\hat{C}_{B2} = C_{B2}/\alpha_c,$$

and the one-way time is $$\hat{T}_t = \frac{C_{A1} - \hat{C}_{B2}}{2} T_i.$$

where $T_i$ is an ideal period of the clocks of the transceivers.

12 Claims, 7 Drawing Sheets

METHOD FOR REDUCING RADIO RANGING ERRORS DUE TO CLOCK FREQUENCY OFFSETS

FIELD OF THE INVENTION

The present invention relates generally to radio communication systems, and more particularly to determining distances between transceivers using two-way ranging, which is known as radio ranging.

BACKGROUND OF THE INVENTION

As shown in FIG. 1, a conventional communication frame 100 for a wireless network includes as fields: a preamble 110, a start of frame delimiter (SFD) 120, a physical layer header (PHR) 130, and a physical layer service data unit (PSDU) 140.

The PSDU typically includes a payload, see IEEE 802, 15.4a-D7 standard, November 2006, incorporated by reference. The preamble 110 can be used for acquisition and ranging. The SFD 120 is used for frame synchronization. The detection of the SFD indicates the beginning of the PHR 130 and the PSDU 140. The frame 100 has a time duration of $T_i$ 160, and a time duration of the PHR and PSDU is $T_2$ 150.

FIG. 2 shows a conventional ranging method. To estimate a distance between a first transceiver A 210 and a second transceiver B 220 in a wireless communications network, the first transceiver A 210 transmits 201 a request frame to the second transceiver B 220. FIG. 2 also shows a time axis 240 for the transceiver A and a time axis 250 for the transceiver B 220. The transceiver A 210 records a time $t_1$ that the request frame was transmitted according to a clock of the transceiver A 210. Upon receiving the request frame, the transceiver B 220 transmits 202 a reply frame to the transceiver A 210. The transceiver A 210 measures the time of arrival (TOA) $t_2$ of the reply frame according to its clock.

A delay at the transceiver B 220 between receiving the request frame and transmitting the reply frame is $T_{ta}^b$ 250. The transceiver B 220 transmits 205 the delay 250 to the transceiver A 210 in a timestamp report. An estimate of the distance D between the transceiver A 210 and the transceiver B 220 is the time for the round trip $T_{round}^A$ 270 minus the delay at the transceiver B 220 divided by two and multiplied by the speed of light.

$$D = \frac{(t_2 - t_1)}{2} c = \frac{(T_{round}^A - T_{ta}^B)}{2} c. \quad (1)$$

A corresponding one-way flight time $T_t$ 260 is $$T_t = \frac{(T_{round}^A - T_{ta}^B)}{2}. \quad (2)$$

The conventional method as specified in method in the IEEE 802.15.4a Standard Draft 7 does not address errors due to a frequency offset between the clocks of the transceivers. Indeed, in practical applications, the measurements of $T_{round}^A$ and $T_{ta}^B$ are different from their true value due to the frequency offset. The clock tolerance of the transceiver A 210 is $e_A$, and the clock tolerance of the transceiver B 220 as $e_B$.

After factoring in the clock tolerances, the one-way time of flight estimate $\hat{T}_t$ becomes $$\hat{T}_t = \frac{T_{round}^A(1 + e_A) - T_{ta}^B(1 + e_B)}{2}. \quad (3)$$

A residual error $e_{fw}$ is a difference between the time of flight estimate with ideal clocks and with clocks with tolerances $e_A$ and $e_B$. Then, $$e_{tw} = T_t e_A + T_{ta}^B(e_A + e_B). \quad (4)$$

Generally, $T_{ta}^B \gg T_t$. Therefore, Equation (4) approximates to $$e_{tw} \approx T_{ta}^B(e_A + e_B). \quad (5)$$

It is desired to reduce the residual error $e_{tw}$. Therefore, a mechanism is needed to reduce the effect of clock frequency offset on the range error.

SUMMARY OF THE INVENTION

The invention provides a method for reducing ranging errors due to a clock frequency offset in two-way ranging between radio transceivers, which minimizes impacts of clock frequency offsets on ranging estimation between two devices using two-way time of arrival measurements.

A first transceiver measures a time $C_{A1}$ between transmitting a request frame and receiving a reply frame, and a time $C_{A2}$ between receiving a first information bit of the reply frame and receiving a last information bit of the reply frame.

A second transceiver measurements a time $C_{B2}$ between receiving the request frame and transmitting the last information bit of the reply frame, and a time $C_{B1}$ between receiving a first information bit of the request frame and a last information bit of the request frame.

A correction factor $$\alpha_c = \sqrt{\frac{C_{B1}}{C_{A2}}}$$

is applied according to $$\hat{C}_{B2} = C_{B2} / \alpha_c,$$

and the one-way time of flight is $$\hat{T}_t = \frac{C_{A1} - \hat{C}_{B2}}{2} T_i,$$

where $T_i$ is an ideal period of the clocks of the transceivers.

DETAILED DESCRIPTION OF THE PREFERRED EMBODIMENT

The embodiments of my invention provide two-way ranging methods for estimating a distance between a first transceiver A and a second transceiver B in a wireless communications network. The method reduces errors due to frequency offsets in clocks of the transceivers.

Figure 1:
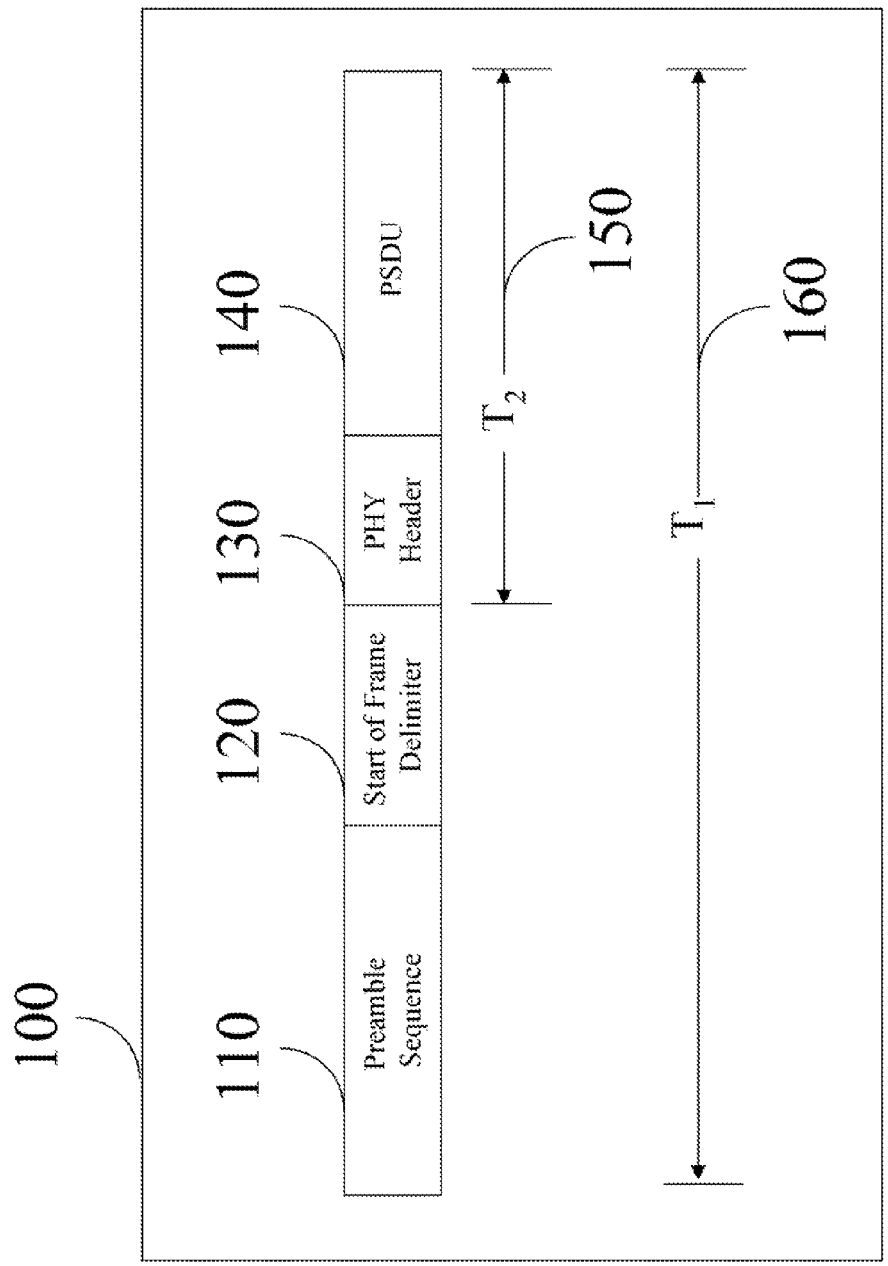
FIG. 1 is a block diagram of a conventional frame used in wireless communications between transceivers.
Figure 2:
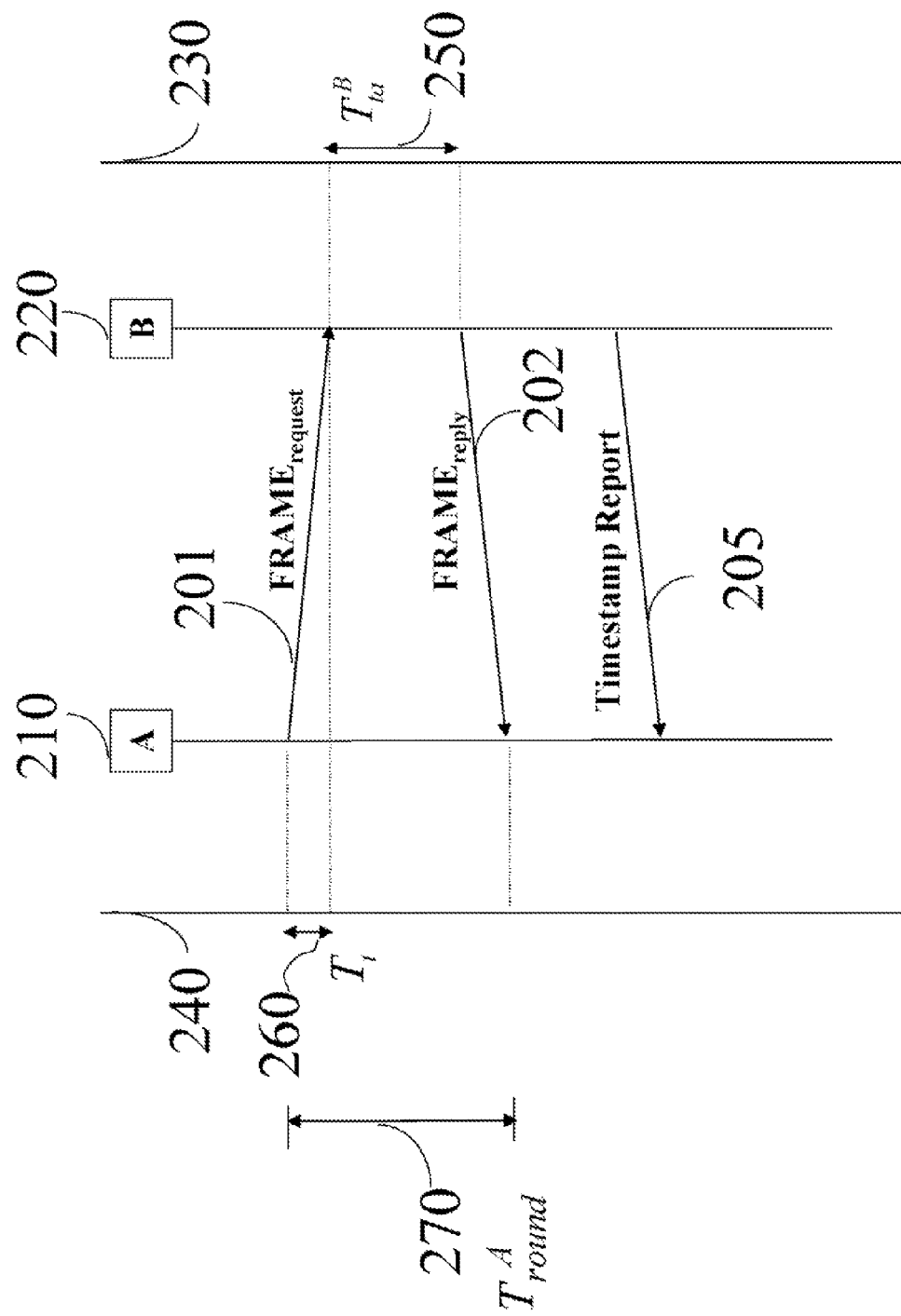
FIG. 2 is a timing diagram of a conventional two-way time of arrival based ranging method.
Figure 3:
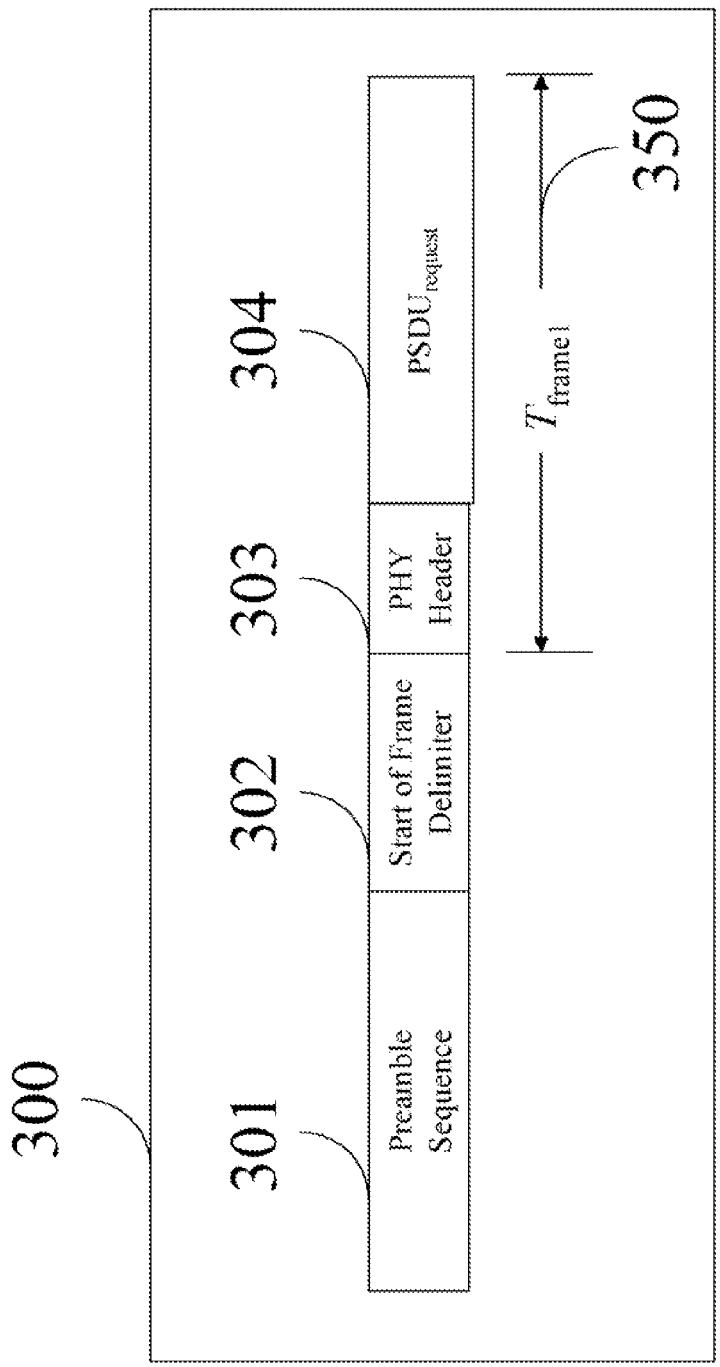
FIG. 3 is a block diagram of a structure of a request frame 300 according to an embodiment of the invention.

As shown in FIG. 3, a request frame 300 includes as fields; a preamble 301, a start of frame delimiter (SFD) 302, a physical layer header (PHR) 303, and request physical layer service data unit ($PSDU_{request}$) 304. The PHR 303 and $PSDU_{request}$ 304 can carry data or information bits of the request frame 300. A time duration of the data or information bit fields 303 and 304 is denoted by $T_{frame1}$ 350.

Figure 4:
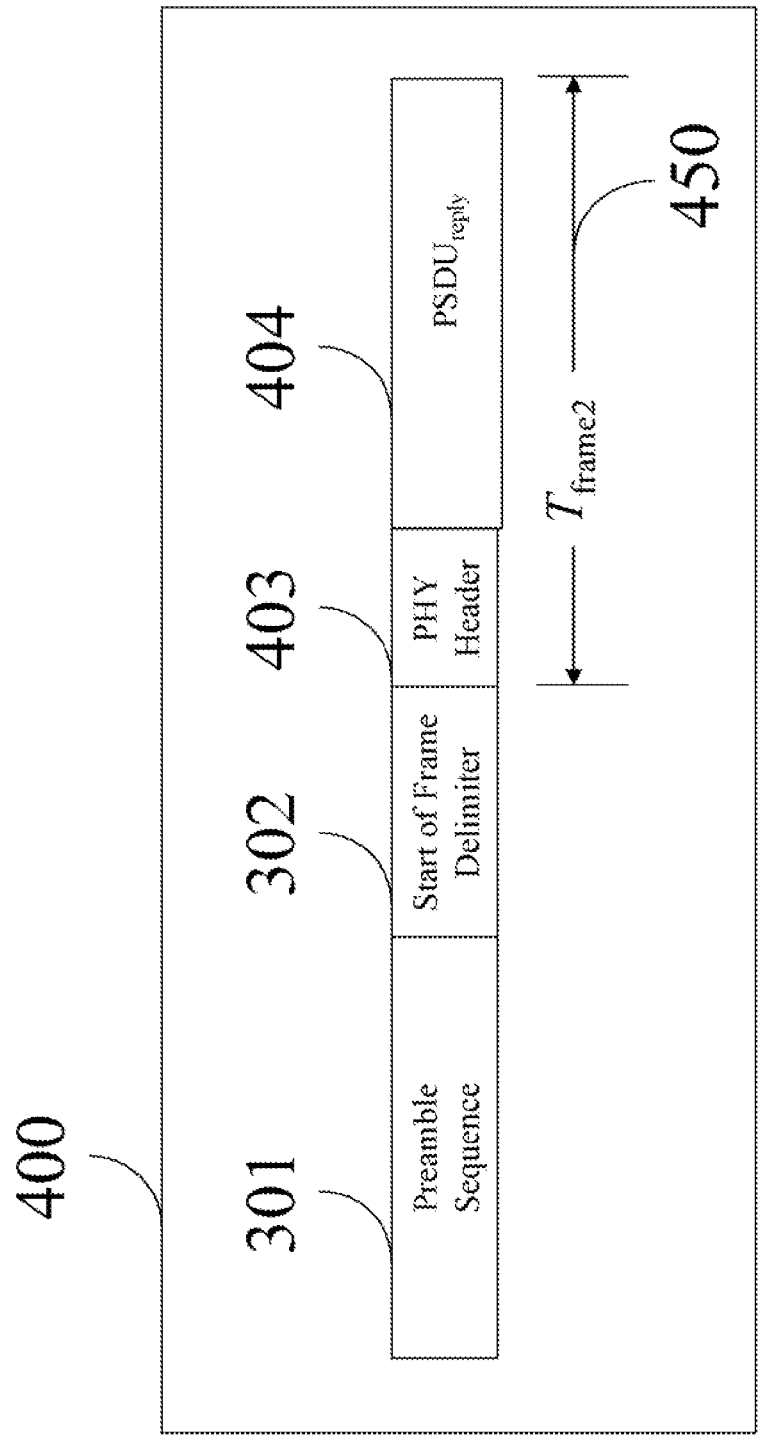
FIG. 4 is a block diagram of a structure of a reply frame 400 according to an embodiment of the invention.

As shown in FIG. 4, a reply frame 400 includes the preamble 301, the start of frame delimiter (SFD) 302, a physical layer header (PHR) 403 and a reply physical layer service data unit ($PSDU_{reply}$) 404. A time duration of the data or information bit fields 403 and 404 of the reply frame is $T_{frame2}$ 450.

The time durations $T_{frame1}$ 350 and $T_{frame2}$ 450 for the information bits can be different. However, for simplicity of this description, the duration for both $T_{frame1}$ 350 and $T_{frame2}$ 450 can be generally denoted by $T_{frame}$.

Figure 5:
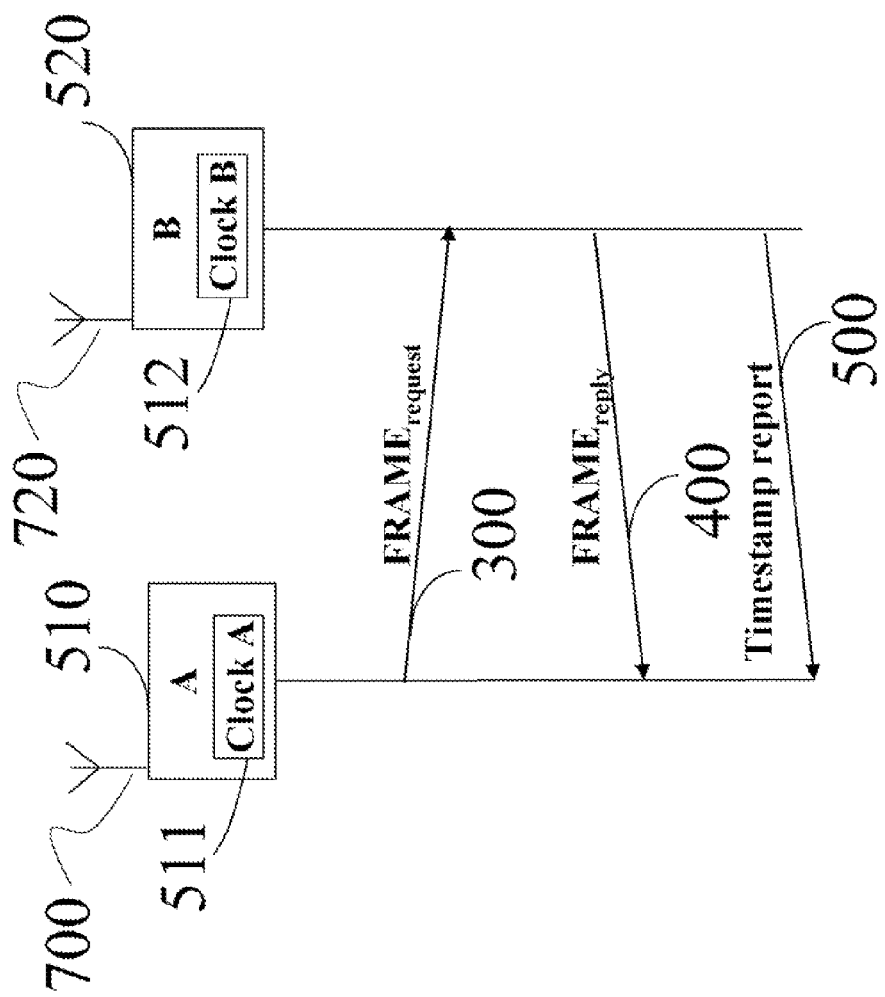
FIG. 5 is a block diagram of a two-way ranging method according to an embodiment of the invention.
Figure 6:
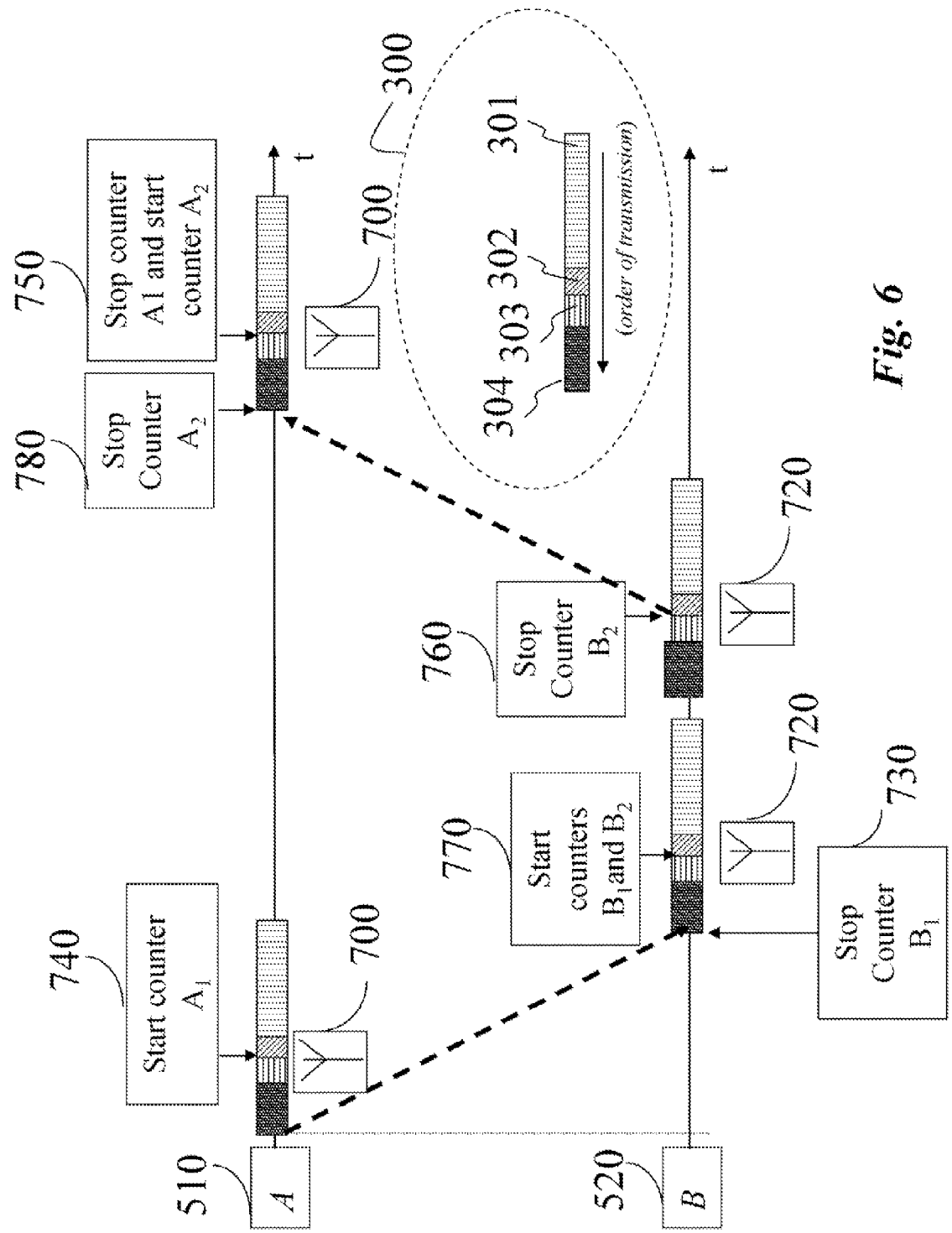
FIG. 6 is a block diagram of an operation of timing counters at transceivers according to an embodiment of the invention.
Figure 7:
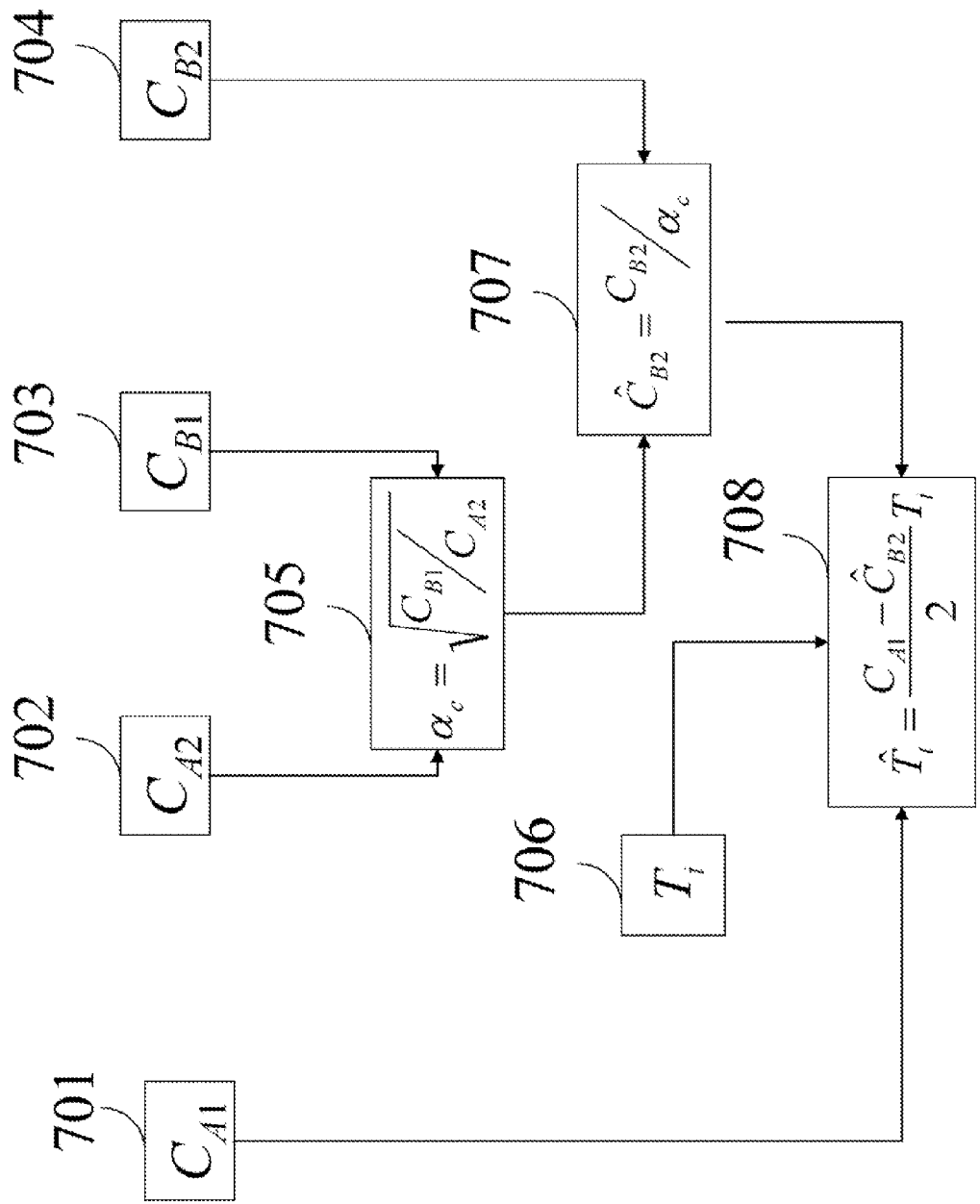
FIG. 7 is a flow diagram of the method according to an embodiment of the invention.

FIG. 5 shows a timing diagram of a ranging method according to an embodiment of the invention. The block diagram of the method is shown in FIG. 6. FIG. 7 shows the method steps. The transceiver A 510 includes a transmit clock 511, and the transceiver B 520 includes a receive clock B 512.

An ideal clock period (cycle) is $T_i$. The clock period is determined by a frequency of a crystal of the clock. The ideal clock frequency is specified by the manufacturer. In real systems, however, the clock frequency can be offset from the ideal frequency due to, e.g., manufacturing inconsistencies or environmental conditions. Therefore, the actual clock period of the transceiver A 510 is $T_a$, and the actual clock period of the transceiver B 520 is $T_b$. It is desired to minimize errors due to this frequency offset.

As shown in FIG. 6, a transceiver A 510 transmits the request frame, see inset 300 for start and end of frame fields, to a transceiver B 520. Transceiver A 510 starts 740 a first transmit counter $A_1$ when the SFD 302 of the request frame 300 is emitted by an antenna 700 of the first transceiver.

The request frame is received in the second transceiver B 520. Transceiver B 520 starts 770 first and second receive counters $B_1$ and $B_2$ when detecting the end of the SFD 302 of the request frame 300 at the antenna 720 of the second transceiver B 520.

Transceiver B 520 stops 730 its first receive counter $B_1$ when receiving a last information bit of the request frame 300, which is at the end of the request PSDU 304.

Transceiver B 520 determines a difference between the start and stop values of the first receive counter $B_1$. The first receiver counter $B_1$ measures a duration $C_{B1}$ 703, where $$C_{B1} = \frac{T_{frame}}{T_i} \frac{T_a}{T_b}, \qquad (6)$$

The transceiver B 520 prepares the reply frame 400 and transmits the reply frame to transceiver A 510.

Transceiver B 520 stops 760 the second receive counter $B_2$ when the end of the SFD 302 of the reply frame 400 is emitted by its antenna 720. The difference between the start and stop values of the second receiver counter $B_2$ is denoted as $C_{B2}$ 704, and its measures a turn around time $$C_{B2} = \frac{T_{ta}^B}{T_b}, \qquad (7)$$

where $T_{ta}^B$ is the true turn around time according to the ideal clock period.

In step 750, transceiver A 510 stops its first transmit counter $A_1$ and starts a second transmit counter $A_2$ when it detects the end of the SFD 302 of the received reply frame 400.

A difference $C_{A1}$ 701 between the start and stop values of the first receive counter $A_1$ corresponds to $$C_{A1} = \frac{2T_t + T_{ta}^B}{T_a}, \qquad (8)$$

where $T_t$ is the one-way flight time of the frame and transceiver A 510 to transceiver B 520.

Transceiver A 510 stops 780 the second transmit counter $A_2$ when it receives the last bit of the $PSDU_{reply}$ 404 of the received reply frame 400 at the antenna 700. The difference between the start and stop values of the second transmit clock $A_2$ is denoted as $C_{A2}$ 702 and is measures the time $$C_{A2} = \frac{T_{frame2}}{T_i} \frac{T_b}{T_a} \qquad (9)$$

Transceiver B 520 transmits the counter values $C_{B1}$ 703 and $C_{B2}$ 704 to transceiver A 510 in a timestamp report 500.

Transceiver A 510 determines a correction factor $$\alpha_c = \frac{T_a}{T_b}$$

705 as a square root of the ratio of $C_{B1}$ and $C_{A2}$. It can be seen after dividing the expression in Equation (6) by the expression in Equation (9) the $$\left[\frac{T_a}{T_b}\right]^2 = \frac{C_{B1}}{C_{A2}}.$$

Transceiver A 510 divides $C_{B2}$ 704 by the correction factor $\alpha_c$ 705 to obtain an estimate $\hat{C}_{B2}$ 707.

The time of flight estimate $\hat{T}_t$ 708 is determined by the transceiver A 510 as $$\hat{T}_t = \frac{C_{A1} - \hat{C}_{B2}}{2} T_i \quad (10)$$

Note that the ideal time period $T_i$ 706 is known to both transceivers, e.g., it is the time specified by the manufacturer.

Ranging Example

A ranging system has the following example values:

$T_{frame}$=100 μs;

ideal clock frequency is 500 MHz, i.e., the ideal period $T_i$=1/500 MHz;

clock frequency of transceiver A 510 is 495 MHz, that is, $T_a$=1/495 MHz;

clock frequency of transceiver B 520 is 495 MHz, i.e., $T_b$=1/495 MHz;

distance between transceivers A and B is 10 m, i.e.,
true one way time of flight is $T_r$=30 ns; and
true turn around time is $T_{ta}^B$=1 ms.

After transmission of the request and reply frames, the corresponding example counter values are:

$C_{B1}$=51515 clock periods according the transceiver B clock;

$C_{A2}$=48529 clock periods according to transceivers A clock;

$$a_c = \sqrt{\frac{C_{B1}}{C_{A2}}} = 1.0303;$$

$C_{B2}$=510,000 clock periods according to transceiver B clock;

$C_{A1}$=495,030 clock periods according to transceiver A clock;

$\hat{C}_{B2} = C_{B2}/a_c$ =495,000; and $$\hat{T}_t = \frac{C_{A1} - \hat{C}_{B2}}{2} T_i = 30 \text{ ns}.$$

This is equal to the true time of flight for a 10 meter separation between the transceivers A and B.

Method Overview

As shown in FIG. 7, the embodiments of the invention provide a method for reducing ranging errors due to the effect of clock frequency offsets between clocks to two transceivers. In practice, a transceiver clock frequency can differ from its ideal clock frequency as specified by the manufacturer due to any of a number of conditions, including but not limited to uncontrollable fabrication processes and environmental conditions. If two transceivers 510 and 520 are performing ranging, the transceivers can have different clock periods or frequencies.

For example, a one nanosecond timing error causes a 30 cm range error. Therefore, an accurate measurement of time is important for precision ranging in the order of centimeters.

According to the embodiments of the invention, if the ranging transceivers know their relative clock frequency offset, the frequency offset related range error can be reduced. To achieve this, each transceiver uses two counters or two instants of a single counter to measure various time periods as described below and shown in the Figures.

The first transceiver 510 measures the number of clock cycles or periods, that is, timing information $C_{A1}$ 701, between the transmission of the request frame 300 and the reception of the reply frame 400.

The first transceiver 510 also measures the number of clock cycles between the reception of the first data or information bit of the reply frame, i.e., the beginning of PHY header, and the last information bit of the reply frame, i.e., at the end of data payload of the $PSDU_{reply}$. This counter value is denoted as $C_{A2}$ 702.

The responding second transceiver 520 measures the number of clock cycles between the reception of the request frame and the completion of transmission of the reply frame. This counter value is denoted as $C_{B2}$ 704.

The second transceiver 520 also measures the number of cycles between the reception of the first information bit of the request frame, i.e., the beginning of PHY header, and the last information bit of the request frame, i.e., the end of the data payload of the $PSDU_{request}$. This counter value is denoted as $C_{B1}$ 703.

The second transceiver 520 transmits $C_{B1}$ and $C_{B2}$ to the first transceiver 510.

The first transceiver 510 determines the correction factor 705 as $$a_c = \sqrt{\frac{C_{B1}}{C_{A2}}}.$$

Then, the first receiver 510 applies the correction factor to $C_{B2}$ to obtain a best estimate 707

$$\hat{C}_{B2} = \frac{C_{B2}}{a_c}.$$

Then, the first transceiver can determine the one-way time of flight 708 as $$\hat{T}_t = \frac{C_{A1} - \hat{C}_{B2}}{2} T_i.$$

This time of flight corresponds to the range or distance between the two transceivers.

It should be noted that the first transceiver could transmit its timing information to the second receiver, in which the second transceiver can perform the ranging.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

I claim:

1. A method for reducing errors in two-way ranging between two transceivers due to a clock frequency offset, comprising:

measuring, in a first transceiver, a time $C_{A1}$ between transmitting a request frame and receiving a reply frame, and a time $C_{A2}$ between receiving a first information bit of the reply frame and receiving a last information bit of the reply frame;

measuring, in a second transceiver, a time $C_{B2}$ between receiving the request frame and transmitting the last information bit of the reply frame, and a time $C_{B1}$ between receiving a first information bit of the request frame and a last information bit of the request frame;

applying a correction factor $$\alpha_c = \sqrt{\frac{C_{B1}}{C_{A2}}}$$

to the time $C_{B2}$ to obtain an estimated time $$\hat{C}_{B2} = C_{B2} / \alpha_c;$$

and determining a one-way time of flight according to $$\hat{T}_t = \frac{C_{A1} - \hat{C}_{B2}}{2} T_i,$$

in which $T_i$ is an ideal period of the clocks of the first and second transceiver and the one-way time of flight corresponds to a range between the two transceivers.

2. The method of claim 1, in which the request frame includes a preamble, a start of frame delimiter (SFD), a physical layer header (PHR), and a request physical layer service data unit ($PSDU_{request}$), and in which a duration of the SFD and the $PSDU_{request}$ is $T_{frame1}$, and the reply frame includes the preamble, the start of frame delimiter (SFD), the physical layer header (PHR), and a reply physical layer service data unit ($PSDU_{reply}$), and in which a duration of the SFD and the $PSDU_{reply}$ is $T_{frame2}$.

3. The method of claim 1, in which the ideal time period $T_i$ is known to the first and second transceivers.

4. The method of claim 2, in which the durations $T_{frame1}$ and $T_{frame2}$ are different.

5. The method of claim 1, in which the clocks of the first and second transceivers have a frequency offset.

6. The method of claim 2, in which the PHR and PSDU carry information bits.

7. The method of claim 2, in which $$C_{B1} = \frac{T_{frame}}{T_i} \frac{T_a}{T_b},$$

and in which $T_a$ and $T_b$ are actual periods of the clocks of the first and second transceiver respectively.

8. The method of claim 7, in which $$C_{B2} = \frac{T_{ta}^B}{T_b},$$

where $T_{ta}^B$ is a true turn around time according to the ideal clock period.

9. The method of claim 7, $$C_{A1} = \frac{2T_t + T_{ta}^B}{T_a},$$

where $T_t$ is the one-way time of flight.

10. The method of claim 7, in which $$C_{A2} = \frac{T_{frame2}}{T_i} \frac{T_b}{T_a}.$$

11. The method of claim 1, further comprising:
transmitting $C_{B1}$ and $C_{B2}$ to the first transceiver in a timestamp report.

12. The method of claim 1, further comprising:
transmitting the request frame from the first transceiver to a second transceiver, in which the request frame includes a preamble, a start of frame delimiter (SFD), a physical layer header (PHR), and request physical layer service data unit ($PSDU_{request}$), and in which a duration of the SFD and the $PSDU_{request}$ is $T_{frame1}$;

starting a first transmit counter $A_1$ of the first transceiver when the SFD of the request frame is emitted by an antenna of the first transceiver, in which periods of the first transmit counter is determined according to a transmit clock having a period $T_a$;

starting a first receive counter $B_1$ and a second receive counter $B_2$ of the second transceiver when detecting an end of the SFD of the request frame at an antenna of the second transceiver, in which periods of the first and second receive counters are determined according to a transmit clock having a period $T_b$;

stopping the first receive counter $B_1$ when receiving a last bit of the request frame;

determining a difference between the start and stop values of the first receive counter $B_1$;

measuring a duration $$C_{B1} = \frac{T_{frame}}{T_i} \frac{T_a}{T_b},$$

in which $T_i$ is an ideal clock period;

transmitting, in response to receiving the request frame, the reply frame from the second transceiver to the first transceiver, in which the reply frame include the preamble, the start of frame delimiter (SFD), the physical layer header (PHR), and a reply physical layer service data unit ($PSDU_{reply}$), and in which a duration of the SFD and the $PSDU_{reply}$ is $T_{frame2}$;

stopping the second receive counter $B_2$ when an end of the SFD of the reply frame is emitted by the antenna of the second transceiver;

measuring a duration $$C_{B2} = \frac{T_{ta}^B}{T_b},$$

where $T_{ta}^B$ is a true turn around time according to the ideal clock period $T_i$;

starting a second transmit counter $A_2$ when the first transceiver detects an end of the SFD of the reply frame, and stopping the first transmit counter $A_1$;

measuring a difference between the start and stop values of the first receive counter $A_1$ correspond to $$C_{A1} = \frac{2T_t + T_{ta}^B}{T_a},$$

wherein $T_t$ is a one-way flight time of the frame the first transceiver to the second;

stopping the second transmit counter $A_2$ when a last bit of the $PSDU_{reply}$ of the received reply frame at the antenna of the first transceiver;

measuring $$C_{A2} = \frac{T_{frame2}}{T_i}\frac{T_b}{T_a};$$

transmitting the first and second receive values $C_{B1}$ and $C_{B2}$ to the first transceiver;

determining in the first transceiver a correction factor $$\alpha_c = \frac{T_a}{T_b}$$

as a square root of the ratio of $C_{B1}$ and $C_{A2}$;

dividing $C_{B2}$ by the correction factor $\alpha_c$ to obtain an estimate $\hat{C}_{B2}$; and estimating a time of flight estimate $\hat{T}_t$ in the first transceiver as $$\hat{T}_t = \frac{C_{A1} - \hat{C}_{B2}}{2}T_i.$$

* * * * *